Aug. 29, 1939.  A. W. KEUFFEL ET AL  2,171,504
MEASURING TAPE
Filed May 12, 1936
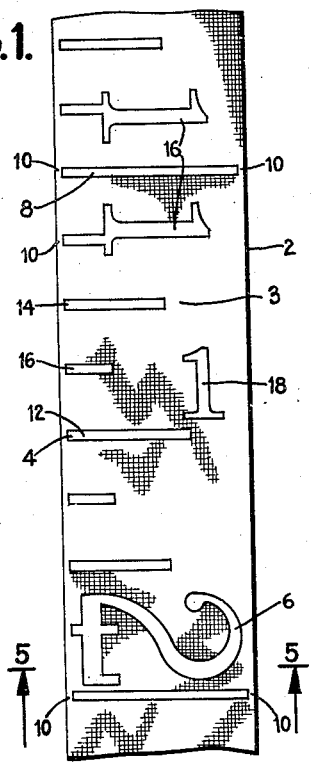
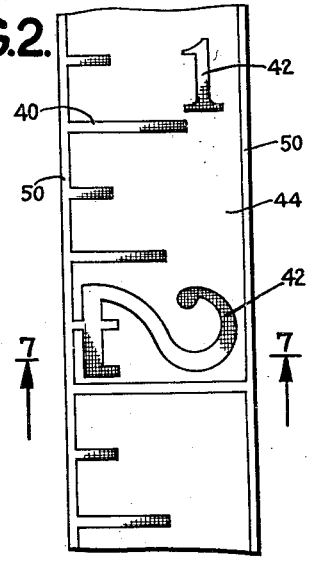
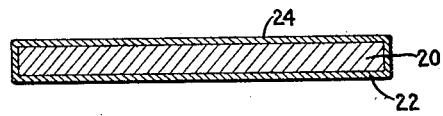
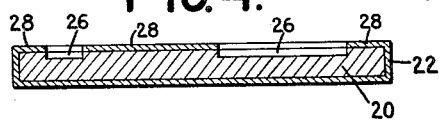
INVENTORS
ADOLF W. KEUFFEL
HOWARD F. SCHERMERHORN
BY Orton and Griswold
ATTORNEYS

UNITED STATES PATENT OFFICE 2,171,504

MEASURING TAPE

Adolf W. Keuffel and Howard F. Schermerhorn, Montclair, N. J., assignors to Keuffel & Esser Company, Hoboken, N. J., a corporation of New Jersey Application May 12, 1936, Serial No. 79,372

8 Claims. (Cl. 33—137)

This invention relates to measuring tapes, rules and other scales of the kind used by engineers and surveyors, also carpenters, builders, carpet layers and others to measure distances, either horizontal or vertical, although not so limited. This invention is particularly suitable for a steel measuring tape.

Heretofore, measuring tapes have been made either of woven fabric or of a ribbon of steel. Fabric tapes are apt to be inaccurate since they stretch in use and are soon worn out if subjected to hard usage. Steel tapes are preferred but their surface soon becomes worn and rusty, rendering the markings thereon difficult to read, especially out of doors and in darkened localities, because of the lack of contrast between characters and background. In the case of tapes prepared by etching away portions in an attempt to provide contrast between the numerals and graduations and the background the tapes as originally made depend solely upon a reflective and a non-reflective surface. Such tapes require light from a particular angle with reference to the eye of the observer in order that they may be read at all. In the course of use, such tapes are frequently wet, either by rain, salt water, marsh water or other corrosive liquids, which cause a rusting or corrosion of the more highly reflective portions that rapidly destroys the original contrast so that the tape becomes very difficultly readable.

It is accordingly among the more important objects of this invention to provide a graduated metal strip, as for example, a steel measuring tape, which has sharp accurate graduations presenting highly legible contrast between the graduations and the background in order that the tape can be easily read under all ordinary light conditions.

Another object is to provide a tape which has a coating on a portion thereof to form a sharp contrast with the uncoated portion. This object includes the provision of a coating composition which can be applied to a metal strip that is subjected to a great deal of friction in use, as well as twisting, bending and the like, without chipping, cracking or otherwise deteriorating.

A further object includes the provision of a graduated metal strip in which the graduations are etched into the body of the metal strip so that they are permanent with reference to such metal strip and filling these etchings with a coloring composition which will form a highly legible contrast with the background.

Another object is to provide a graduated tape in which the graduations are raised from the body of the tape either by etching away the background or applying metal to the normal surface of the tape to produce raised graduations and numerals and filling in the background with a coloring material to contrast with these graduations.

An important object is to provide a graduated etched strip which has greater strength than normal etched tapes by restricting the length of the graduations and indicia so that none extends to either edge of the tape, whereby the edge of the tape is strengthened against breaking stresses.

In carrying this invention into effect, according to one modification, a strip of metal as, for example, brass, steel or high carbon steel of suitable dimensions, after the usual preliminary cleaning is subjected to electrolytic treatment in order to apply a coating of, for example, black nickel to at least one surface of the strip. This coating may and conveniently is applied to both surfaces and the edges of the metal strip and produces a black finish thereon. It will be appreciated, of course, that instead of applying a coating of black nickel to the metal strip, other types of coatings may be applied which will provide a surface that can be combined with another colored material to furnish legible contrast between the two or the black nickel coating may be applied as a later step in the process. After the pretreatment of the metal strip it is coated in portions as, for example, where graduations and numerals are to appear, with an etch resist in order that when the strip is immersed in the etching bath only certain portions thereof, in this case the background, will be attacked by the etching solution. As the strip is subjected to the etching bath the surface not covered with the resist is etched away and the etching continues down into the body of the metal to an extent depending upon the strength of the bath and the time of treatment. This is so controlled as to cause a small but appreciable change in elevation between the normal surface and the depressions and may if desired be a few ten-thousandths of an inch. The etching need not be carried out to the extent that it is in ordinary etched tapes, since the legibility of the tape is secured by different means and in view of this lesser amount of etching the strength of the tape is not lessened to the extent that it would be were the tape etched for producing the customary type of etched tape.

After the desired portions of the tape have been etched to the extent necessary, the strip is removed from the etching bath and treated to prevent further action of the etching solution as by neutralization and/or washing off the etching solution, which may also remove the resist. The tape which has black elevated portions and etched depressions is now ready to have the depressions filled with a coating composition which will sharply contrast with the unetched portions of the tape and which will firmly adhere to the metal while at the same time withstand the flexing, bending and twisting commonly incurred in the normal use of such graduated strips as measuring tapes.

It has been found that a coating composition which fills the requirements heretofore set forth is a pigmented, synthetic resin, coating composition in which the resin may be any of the well known types as, for example, phenol formaldehyde, alkyd, etc., either normal or modified in suitable solvents. One of the preferred compositions which has been successfully employed had the following composition:

| | Per cent |
|---|---|
| Solid alkyd phenol aldehyde resin, oil modified, about | 27 |
| Pigments, such as titanium oxide, titanox B, zinc sulphide, antimony oxide, titanated lithopone, about | 33 |
| Solvent, approximately | 40 |

The solvent, based on the total composition, may comprise about 30% of aliphatic petroleum hydrocarbon such as mineral spirits with about 10% of aromatic hydrocarbons, as for example, turpentine, terpines, dipentine toluol, benzol, xylol, and the like.

The composition should preferably also include metallic dryers such as oil soluble salts of cobalt, manganese and lead in the proportion of a fraction of a percent of the solid resin.

This pigmented coating composition or other equivalent composition can be applied in any desired manner to the etched strip such as, for example, printing it into the cavities forming the graduations and numerals, spraying it onto the treated face or both faces, applying it with a roller or scraper or by passing the strip through a bath of the coating composition. In some cases the coating as originally applied tends to cover the entire surface but may be removed from the elevated portions by a wiping blade or roller and the like, so as to produce a strip having the coloring material only in the recessed depressions which, in this case, form the background. After the coating composition is dried the tape may be considered complete or, as is usually preferable, it may be passed through a clear coating composition such as a cellolose ester or synthetic resin lacquer which protects all surfaces of the strip.

According to another modification of the invention the selected metal strip is coated with the black nickel and a resist applied which covers only those portions of the face of the strip which are to form the background for the graduations and numerals. When the strip is now etched in the manner described above, the metal is removed in the portions which are to form the numerals and graduations while the background is raised with reference to the numerals and graduations. The coating composition may then be applied to fill in all of the depressions, which represent only a small portion of the surface of the tape, in the manner described in connection with the other modifications.

Instead of providing elevational differences between the graduations and background by etching, it will be obvious that other methods might be used, as for example, by applying a patterned layer of metal electrolytically, by spraying molten metal through a mask or in other ways which will be obvious to those skilled in the art. By whatever method the end is secured the strip of metal will have elevated portions and depressed portions. These terms as used in this specification and claims should be considered generic and relative rather than as an indication of the means by which the result is secured. In other words, although the background might be described as depressed with reference to the graduations, the graduations, as a matter of fact, might have been applied by raising certain portions of the normal surface of the strip to form the difference in elevation rather than by actually depressing a portion of the tape from the normal surface. Instead of either adding metal to the strip or removing metal from the strip to form the differences in elevation certain types of metals could be stamped, pressed, molded or the like to form the elevational contrasts required. Regardless of the method by which these elevational contrasts are secured in following the teachings of this invention, the depressions are filled with a contrasting coating composition to provide highly legible contrast between the coated and uncoated portions. While certain portions of the tape have been considered as uncoated they are preferably precoated with the black nickel. Alternatively, the black nickel coating may be dispensed with and the contrast secured between the natural surface of the metal and the coating composition. As an alternative step in the process, either before or after the depressions have been filled in, a contrasting coating may be applied to the elevated portions to provide any desired contrasts between two coating compositions. In any case should the coating composition filling the depressions or that covering the elevated portions tend to become worn through long and severe service, there would always remain the elevational contrast between the normal surface and the depressions.

In the modification involving depressions to designate the indicia including the numerals and graduations, the longest graduations, as well as the numerals which tend to form straight lines across the strip as, for example, I and 4, are dimensioned and arranged so that they do not extend to either edge of the tape. In this way the edge of the tape has a continuous band of constant thickness whereby the tape is materially strengthened in comparison with strips in which there are deep transverse lines all the way across. According to the modification in which the background is depressed, it is preferred that the background extend only to within a short distance from the edge of the strip so that a continuous bead, seam or border extends along both edges of the face of the strip. In this manner the edge of the tape is also strengthened.

To secure these and other related advantages, which will be apparent, the invention is further described as to certain preferred embodiments in the following description and illustrated in the attached drawing, which are to be considered illustrative rather than restrictive of the invention and in which:

Fig. 1 is a view in plan of a tape prepared according to one modificatoion of the invention;

Fig. 2 is a view in plan of a tape prepared according to a second modification of the invention;

Fig. 3 is a view in cross section of a metal tape after the application of the black nickel coating;

Figs. 4 and 5 are views in section taken along the line 5—5 of Fig. 1, illustrating steps in preparing the modification of Fig. 1, while Figs. 6 and 7 are views in cross section taken along the line 7—7 of Fig. 2, showing steps in the preparation of the modification of Fig. 2.

Referring now more particularly to Fig. 1, there is illustrated in that figure a section of completed tape 2 of the type in which the graduations 4 and numerals 6 have been formed by relatively depressing those portions of the tape which are to represent graduations and numerals. The graduations 4, as illustrated, have relatively long lines 8 representing inches extending substantially the entire width of the tape but stopping short of the edge to form a bead 10 providing a continuous edge to the tape without any depressions. Between the longer graduations 8 are shorter graduations 12 representing half inches, still shorter graduations 14, representing one-quarter inches, and futher graduations 16, designating one-eighth inches. As will be obvious, instead of dividing the inch or other unit into the portions designated, they could be divided in tenths, sixteenths, or any other desired fraction. The shorter graduations all begin at a short distance from one edge of the tape so that there is always maintained a continuous bead 10 along both edges of the tape. At 16 is illustrated an inch designating numeral, specifically 11, indicating that the line 8 is a measurement of 11 inches. At the next inch graduation the large numeral 2 indicates a measurement of 2 feet. There may also be provided an additional numeral 18 to indicate the number of feet from the end of the tape without reference to the foot numbers at the end of each foot, so that at 18 the half inch mark 12 would measure one foot, 11½ inches from the end of the tape. These numerals 18 provide the exact number of feet from the end of the tape at any particular point without reference to the last or next succeeding foot number and are desirably provided at each half inch mark after the first foot.

As stated, the graduations and numerals in the embodiment illustrated in Fig. 1 are formed by depressions with reference to the general surface of the tape. To prepare a tape of the type illustrated in Fig. 1, a flat strip of metal 20 suitably dimensioned for the particular purpose and shown in cross section in Fig. 3, is first cleaned in the usual manner and subjected to, for example, an electrolytic treatment to apply a thin coating 22 of black nickel on both faces and edges of the metal strip 20. When the coating 22 has been applied, one surface, as for example, the top surface 24 of the metal strip 20, is marked in a customary manner by printing thereon an etch-resisting covering for the background leaving numerals 6, graduations 4, etc. uncovered. Etch-resists are well known in the art and when applied to a metallic body, which is later subjected to an etching bath, the etching action is confined to those portions of the metal strip which have not been protected. In this case it will be the background which is protected. The strip of metal is passed through or dipped in an etching bath under controlled conditions of bath concentration, temperature and time to remove, first, the black nickel coating 22 from those portions not protected by the resist, followed by a uniform removal of the metal itself in the unprotected areas. If desired, the resist can also be applied to the back of the strip to protect the coating of black nickel thereon during the etching. After the strip of metal has been removed from the etching bath, it is in cross section substantially as illustrated in Fig. 4, with depressions 26 representing portions of the numeral 2 designated as 6 in Fig. 1, the section illustrated being taken along the line 5—5 of Fig. 1.

Before further treatment of the strip the etching process must be stopped since the residual liquid would tend to continue etching until it had expended itself and to prevent this continued action the metal strip is passed through a bath to neutralize the action of the etching solution and to wash reaction products away. The strip now has depressed portions 26 which have a characteristic metallic lustre produced by the etching bath and elevated portions 28 presenting a black appearance from the black nickel coating. At this stage the strip is similar to some types of conventional etched tapes, although preferably the depressions 26 are not quite as deep as they would have been if the tape were etched for producing an ordinary etched tape. The depressed portions 26 would, if left untouched, be readily subject to corrosion and, as a result of such corrosion, any original contrast between the elevated portions 28 and the depressions 26 would be rapidly lost in use. At some stage, it is generally desirable to treat the tape with rust-preventing agents, commonly used as baths of phosphoric acid and phosphate salts, to increase the resistance of the metal strip to corrosion. Even in the case where a coating is to be applied to fill the depressions 26, it is desirable to rust-proof the basic metal since this treatment makes the surface of the metal more receptive to a coating composition.

If the tape has been prepared by following the procedure above described, it is now ready to receive a coating composition which will fill the depressions 26 representing numerals 6 and graduations 4. This coating composition is preferably an artificial condensation product suitably pigmented and dissolved in a solvent and may conveniently be the type specifically described heretofore. It may be applied to the tape in any of a number of ways, but one of the preferred methods is to pass the tape through a bath of such pigmented coating composition which will obviously not only fill the depressions but also coat the raised portions 28 of the front of the tape, the edges and the back. Before the coating composition has had an opportunity to set or dry, if this procedure is used, a scraping blade or roller is passed over the front of the tape to remove the coating from the elevated surfaces 28, thereby leaving the original black nickel surface to contrast with the coating composition which may desirably, in this case, be white, filling the depressions 26. A tape after such treatment is illustrated in Fig. 5, which is a cross section along the line 5—5 of Fig. 1 and shows the coating composition 30 filling the depressions 26. In order to assist the setting and drying of the coating composition it may be found desirable to subject the coated strip to elevated temperatures of about 200° F. for several hours.

Instead of applying the coating composition 30 in the manner just described, it may be applied by passing the tape through friction rollers having the coating material on one side, by printing the coating composition into the depression, by passing the tape between scraper blades or in any desired manner. If the coating composition is applied by dipping the tape into a coating composition bath or continuously passing it therethrough and later removing the excess from the face of the tape there can be left a layer of coating 32 (Fig. 5) on the edges and back of the strip.

After the layer coating 30, filling the depressions, and that 32, covering the sides and back of the strip, have dried, a clear cellulose ester lacquer may be applied to cover the entire strip as a top protective coating for both the black nickel portions and the contrasting colored coating composition.

A composition suitable for this purpose has the following composition:

| | Parts by weight |
|---|---|
| ½ second R. S. nitrocellulose | 14 |
| Dibutyl phthalate (plasticizer) | 4.65 |
| Secondary amyl acetate (solvent) | 25 |
| Various additional solvents, diluents, partial solvents and even non-solvents comprising alcohol, amyl alcohol, ethyl acetate, toluol, mineral spirits, etc., to make 100 parts of lacquer. | |

The lacquer may be thinned by relatively decreasing the proportions of the cellulose ester and plasticizer.

This lacquer is particularly useful as a top coat in this process since after the pigmented coating has been set and dried it will not redissolve when the lacquer is applied. If the lacquer contained solvents which, under the conditions of application, would redissolve the pigmented coat, it would run and cover other portions of the strip, reducing the accuracy of the graduations as well as making them indistinct. Alternatively the pigmented coat may be baked or otherwise made insoluble so that the selection of a solvent for the top coat is not limited.

As an alternative method, instead of applying a preliminary coating of, for example, black nickel, before the etching process, the resist may be applied to the untreated tape followed by the usual etching steps. If the remainder of the process is carried out as described above, the elevated portions 28 will present a surface having the characteristic lustre of the metal and for some purposes particularly if lacquered may be entirely satisfactory. On the other hand, it may be preferable to change this color and either before or after applying the pigmented coating composition 30 the entire strip may be coated with the black nickel or any other coating composition desired, which will, when the depressions are filled, contrast with the composition filling the depressions. If this procedure is followed it is important that the additional coating shall not be one which will tend to completely fill the depressions, otherwise it would be difficult to apply the contrasting coating composition 30 in the desired portions.

Illustrated in Fig. 2 is another modification of the invention in which the graduations 40 and numerals 42 are elevated with reference to the background 44. To secure a tape of this type the procedures described in connection with the modification of Fig. 1 may be followed, except that in applying the etch resist it is restricted to those areas which will later represent the graduations and numerals, as a result of which the etching solution attacks only the background areas to produce a strip having depressions 46 as illustrated in Fig. 6, a cross sectional view taken along the line 7—7 of Fig. 2 to show a strip of metal after the etching treatment.

The depressions 46 are filled with the coating composition 48 which may conveniently be of the same composition as that designated 30 in connection with the modification of Fig. 1.

The tape as prepared according to the modification of Fig. 1 will have, if a black nickel coating is used, a black background 3 with colored numerals 6 and graduations 4. If prepared according to the modification of Fig. 2, the ultimate product will have black numerals 42 and graduations 40 with a colored background 44. It is desirable when the background portions are depressed to receive the coating composition that the background does not extend to the edges of the tape. To this end beads, seams or ridges 50 are continuous along both edges of the strip on the face.

In the foregoing description as applied to a specific method by means of which the modifications of Fig. 1 and Fig. 2 might be produced, details have been provided for producing the finished tape in which the differences in elevation between the background and the numerals or graduations are secured by etching. As will be obvious certain of the advantages of the invention can readily be obtained by producing these elevational differences in other ways. The metal strip might, for example, be molded or, on the other hand, pressed to produce raised portions and depressed portions. When the elevational differences are produced by pressing the opposite sides of the tape will each show the graduations and numerals but in reversed condition. Other methods by means of which the elevational differences can be secured include applying patterned layers of metal electrolytically, or spraying metal onto the surface of the strip through a mask to control the areas which would be raised. Other means for producing the elevational differences will occur to those skilled in the art.

Color contrasts of black and white have been specifically described but other colors including yellow, orange, green, purple, red, etc. may be used in contrasting combinations.

It will thus be apparent that through the teachings of this invention it is possible to prepare a new and useful graduated metal strip especially useful as a measuring tape that avoids many of the drawbacks inherent in the common type of commercial etched tape, particularly in that the tape is greatly strengthened, is protected against corrosion, has higher original legibility and after use does not lose this high legibility, as do those tapes generally known and used.

While the invention has been described as to certain preferred embodiments, various changes therein will occur to those skilled in the art and to that end the foregoing description and illustrations should be considered as exemplifying and not as limiting the invention, the scope of which is set forth in the appended claims.

What is claimed as new and desired to be secured by Letters Patent is:

1. A highly legible graduated metal tape with permanent graduations comprising a metal strip with portions thereof etched according to a pattern of the graduations forming depressions from the normal surface of the strip and a pigmented coating material filling said depressions to contrast with the normal surface and make the graduations very legible.

2. A highly legible metal tape with permanent graduations comprising a metal strip with depressed etched background portions below the remaining normal surface representing graduations and a pigmented coating on said strip filling the depressions between the relatively raised graduations and furnishing a legible contrast with the graduations.

3. A highly legible graduated metal tape with permanent graduations comprising a strip of metal, one surface of which has raised portions and depressed portions, said raised portions comprising graduations extending transversely of the metal strip and a longitudinal bead extending along both edges of said strip on said surface, and a pigmented coating material filling said depressed portions to substantially the level of the raised portions to provide a legible contrast with the graduations.

4. A highly legible graduated metal tape with permanent graduations comprising a strip of metal with raised graduations having a coating of black nickel and depressions between the graduations filled to substantially the level of the raised graduations with a synthetic resin pigmented coloring material legibly contrasting with the black nickel.

5. A highly legible graduated steel measuring tape with permanent metal graduations comprising a strip of high carbon steel at least one surface of which is coated with black nickel, depressions in said surface to form raised graduations and depressed background portions, and a pigmented coating in the depressed portions firmly bonded to the metal strip filling the depressions to the level of the graduations to provide sharp legible contrast between the black nickel raised metal graduations and colored background.

6. In a highly legible graduated metal measuring tape having a pigmented coating material to provide legible contrast between the graduations and background a bead extending along each edge of the graduated side protecting the pigmented coating material and strengthening the edges of the tape.

7. A highly legible graduated metal tape with permanent graduations comprising a strip of metal with raised metallic graduations and depressions between the graduations filled substantially to the level of the raised metallic graduations with a pigmented coloring material legibly contrasting with the raised graduations.

8. A highly legible graduated steel measuring tape with permanent metal graduations comprising a strip of high carbon steel, depressions in said surface to form raised graduations and depressed background portions, and a pigmented coating in the depressed portions of the metal strip filling the depressions to the level of the graduations to provide sharp legible contrast between the raised metal graduations and colored background.

ADOLF W. KEUFFEL.
HOWARD F. SCHERMERHORN.